United States Patent [19]  [11] 3,889,573
Girardi  [45] June 17, 1975

[54] BROACHING MACHINE

[75] Inventor: Vincent J. Girardi, Grosse Pointe, Mich.

[73] Assignee: The Babcock & Wilcox Company, New York, N.Y.

[22] Filed: Sept. 4, 1973

[21] Appl. No.: 393,898

[52] U.S. Cl. ............................ 90/78; 90/70; 90/89
[51] Int. Cl. .......................................... B23d 37/18
[58] Field of Search ............... 90/70, 78, 89, 63, 10

[56] References Cited
UNITED STATES PATENTS

| 401,987 | 4/1889 | Waterman | 90/89 |
|---|---|---|---|
| 1,170,010 | 2/1916 | Smith | 90/70 |
| 2,838,980 | 6/1958 | Babcock | 90/78 |

*Primary Examiner*—Gil Weidenfeld
*Attorney, Agent, or Firm*—Barnes, Kisselle, Raisch & Choate

[57] ABSTRACT

A broaching machine comprising a base and means on the base for supporting a workpiece rotatably and indexing the workpiece about an axis for bringing successive portions of the periphery thereof in position for broaching. An endless broaching chain is mounted on said base for movement in a plane extending substantially horizontally. The broaching chain has carriers thereon for broaching tools, and a reach of the broaching chain extends along the work supporting means to provide a broaching operation on the periphery of the workpiece as the tools are moved past the periphery.

3 Claims, 4 Drawing Figures

BROACHING MACHINE

This invention relates to broaching machines.

BACKGROUND OF THE INVENTION

In the broaching of parts it is common to utilize two basic types of machines. In one type of machine the broach cutters are mounted on endless chains and moved past the workpiece. In another type of device wherein the workpieces are substantially larger and heavier, the broaching cutters are mounted on reciprocating slides that move alongside the workpiece. After each movement of the slide in one direction, the workpiece is moved laterally away from the slide clearing the broaching cutters, the broaching slide is then returned to its original position and the workpiece is thereafter indexed to bring another portion of the periphery thereof into position for a broaching operation and moved back into position again to perform a work function.

In the first-mentioned type of broaching machine, the plane of the chain extends vertically and the workpiece is positioned above the upper reach of machine. Where the workpiece is rather large and heavy, the structure for supporting the workpiece becomes very large and cumbersome and has insufficient strength to support the workpiece above the upper reach of the chain. Accordingly, for larger workpieces it has been common to use the second aforementioned type of broaching machine wherein the tools are on a slide.

In the second-mentioned type, the added mechanism and associated cost for providing power and accurate movement of the workpiece toward and away from the slide during the return movement of the slide adds to the cost and complexity of the apparatus.

Accordingly, among the objects of the invention are to provide a broaching machine which will support heavy workpieces and wherein a high production rate can be achieved with a machine that has a relatively short length.

DESCRIPTION

Figure 1:
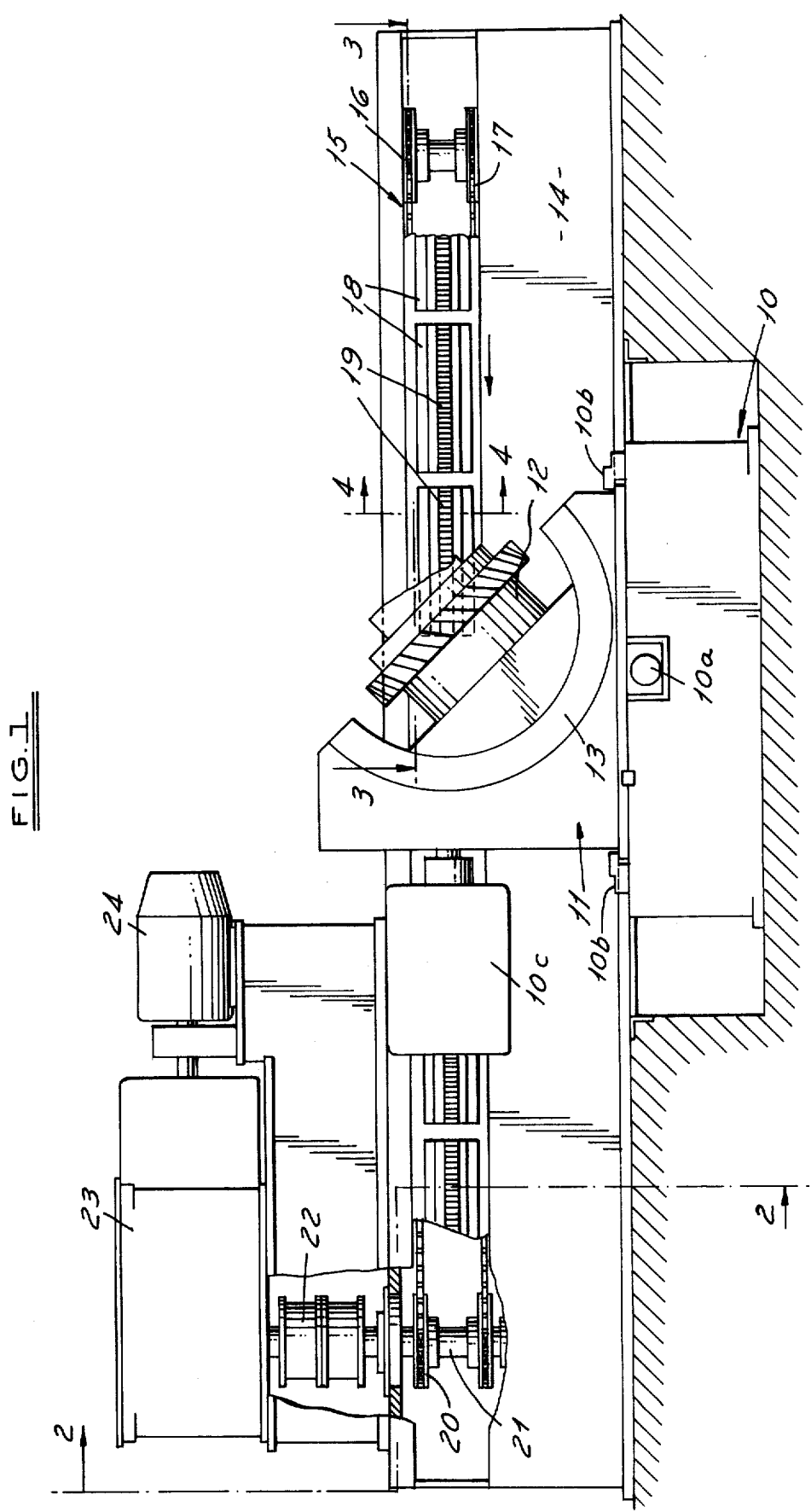
FIG. 1 is a side elevational view of a broaching machine embodying the invention.
Figure 2:
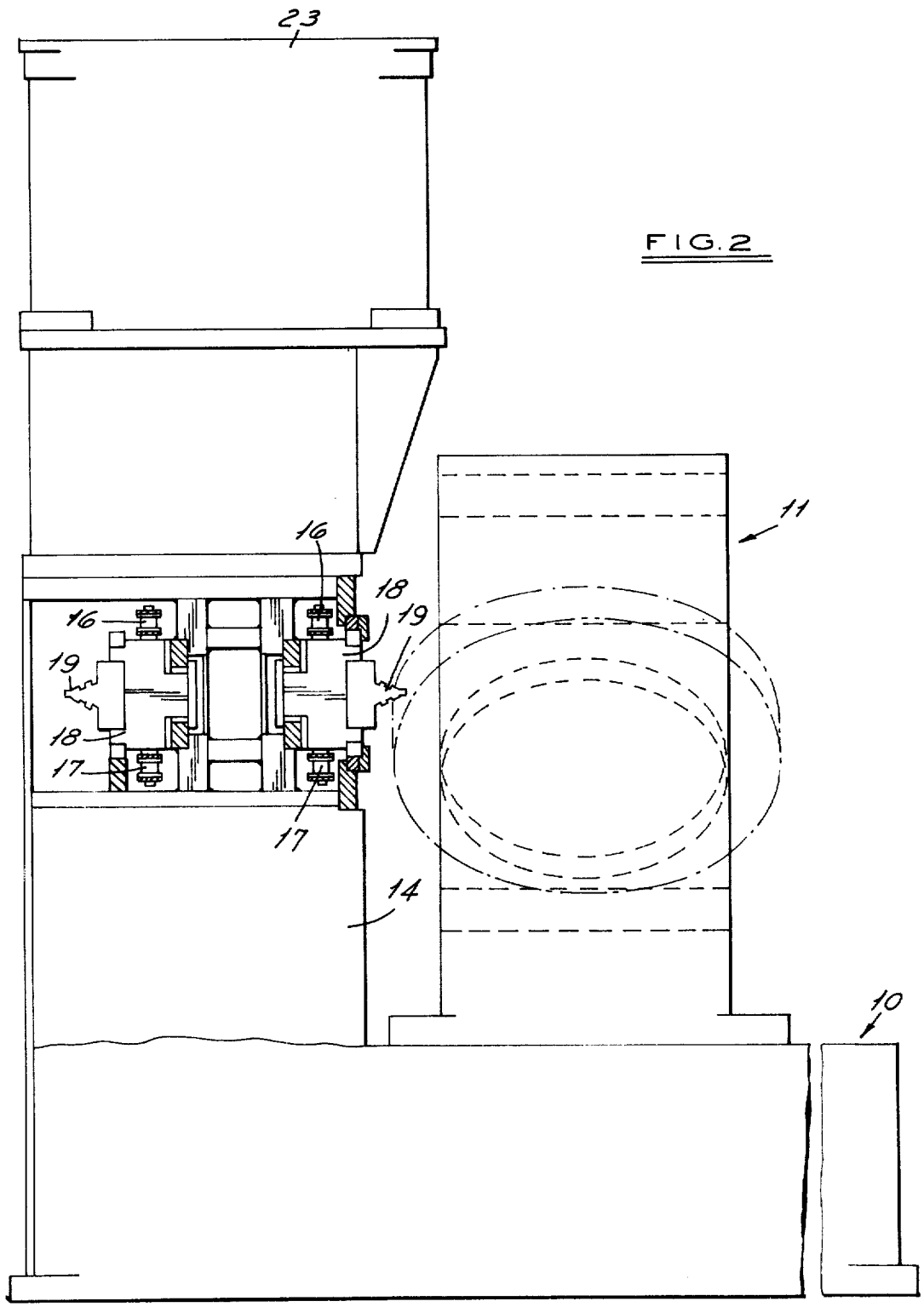
FIG. 2 is a fragmentary part sectional view taken along the line 2—2 in FIG. 1.
Figure 3:
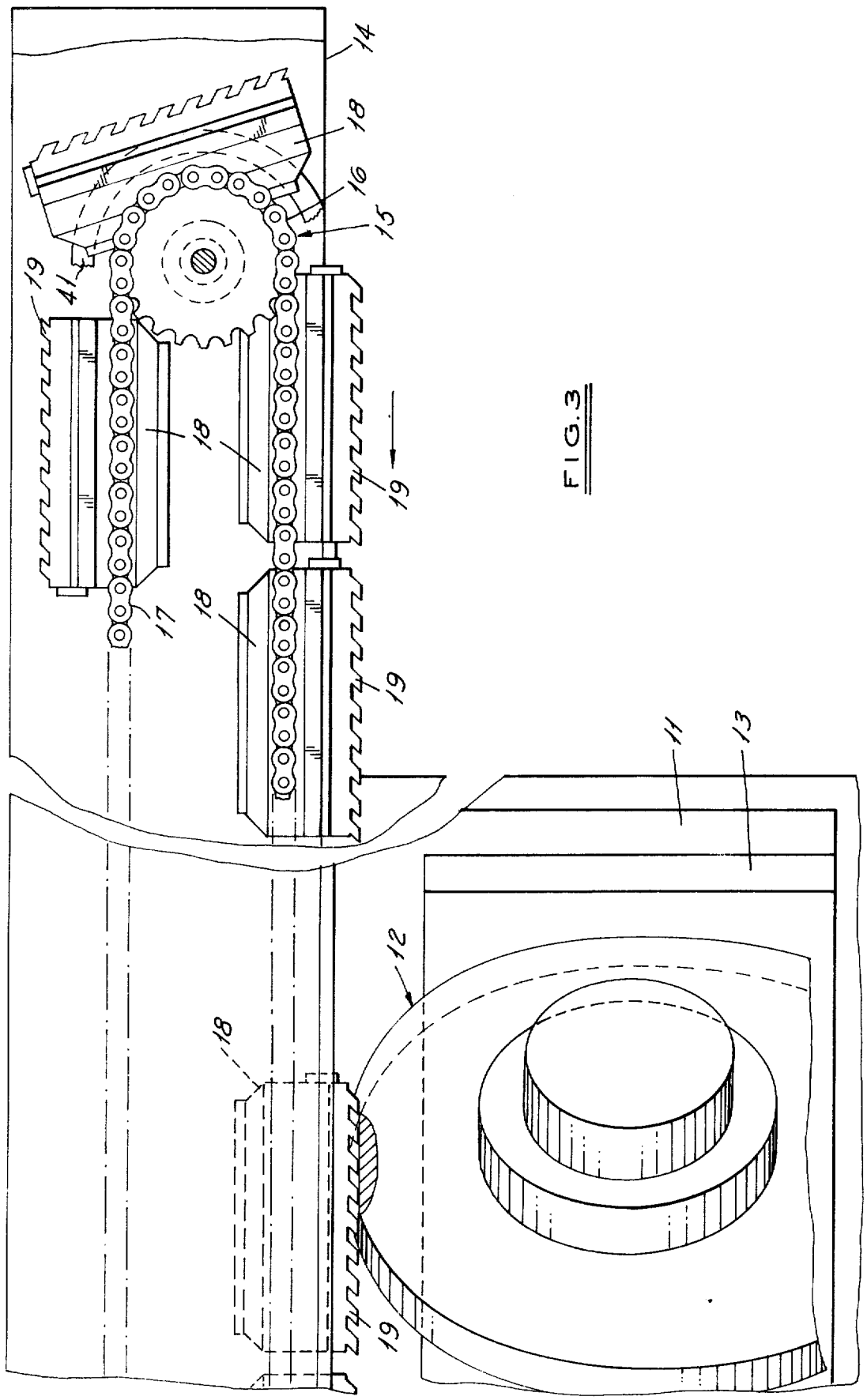
FIG. 3 is a fragmentary part sectional view taken along the line 3—3 in FIG. 1.

In accordance with the invention, the broaching machine comprises a base 10 that supports a holding fixture 11 including a rotatable and indexable table 12 that not only can be rotated to index a part but in addition can be moved angularly along the arcuate slide 13 to bring various portions of a part into position for performance of a broaching operation. Such a holding fixture is old and well known in the art. To provide for set up of the machine, a cylinder 10a on the base is connected to fixture 11 to move the fixture. In operation, clamps 10b lock the fixture against movement. A thrust block 10c on the base 10 functions to back up fixture 11.

The broaching machine further includes on the base 10 a frame 14 that supports a broaching chain 15 comprising spaced chains 16, 17 for rotation in a horizontal plane. The chains 16, 17 support carriers 18 on which broaching tools 19 are mounted. The mounting of the chain so that the planes thereof are in horizontal position causes the carriers 18 and in turn the broaching tools 19 to move along one reach or path adjacent the periphery of the workpiece on the fixture 11. The chains 16, 17 are trained over sprockets 20 that are fixed on shafts 21 one of which is driven through a coupling 22 and gear box 23 by a motor 24.

Figure 4:
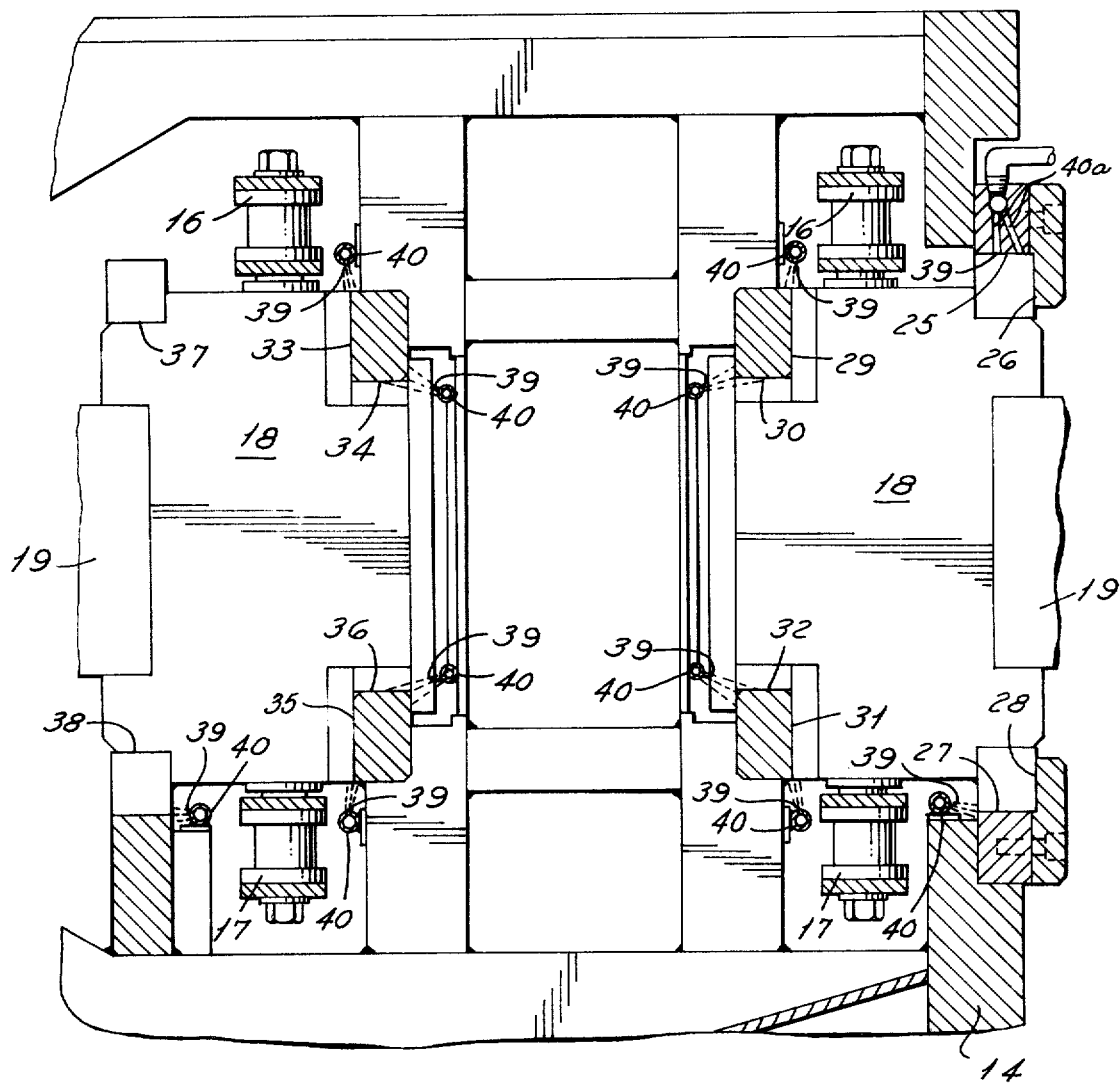
FIG. 4 is a fragmentary sectional view taken along the line 4—4 in FIG. 1.

As shown in FIG. 4, each carrier 18 is fixed to the chains 16, 17 and has portions or slides that engage complementary slideways on the frame to provide a backup force for the carriers as they move through the work station. On the working side of the chains 16, 17, surfaces 25–32 are provided for absorbing the force of broaching on the carriers while on the non-working side, surfaces 33–38 are provided for supporting the carriers. Also the carriers are supported by a guide 41 as they are carried about the sprockets. Lubricant at high pressure is applied to the surfaces from openings 39 in pipes 40 and through passages 40a to lubricate the surfaces.

Since the indexing fixture 11 is mounted on the base 10, it can readily support heavy workpieces and the heavy workpieces can readily be brought into position and removed from the fixture. By providing one path of the fixtures or carriers along the periphery of the workpiece, the broaching operation can be conducted continuously by rotating the chains in one direction and indexing successive portions of the workpiece to bring successive portions into engagement with the workpiece.

As contrasted to the aforementioned prior art broaching machines, there is no need to move the workpiece toward and away from the broachine tools as occurs in the slide mechanism heretofore described. By providing a broaching machine in accordance with the invention, it is possible to broach large workpieces accurately. The workpieces can be readily loaded. Visual inspection of the broaches is made easier. The carriers are supported more rigidly. In addition, changing of tools is made easier. The removal of chips is facilitated.

I claim:
1. In a broaching machine, the combination comprising
   a base,
   means on the base for supporting a workpiece rotatably,
   said means being adapted to index the workpiece about an axis for bringing successive portions of the periphery thereof in position for broaching,
   an endless broaching chain on said base mounted for movement in a plane extending substantially horizontally,
   said broaching chain having carriers thereon for broaching tools,
   said broaching chain having a first reach in said horizontal plane thereof that extends along the work supporting means to provide a broaching operation on the periphery of the workpiece as the tools are moved past the periphery,
   said broaching machine having a second reach in said horizontal plane that extends parallel to said first reach,
   bearing means along said first reach adjacent the work station for providing lateral support for the carriers to absorb the force of the broaching upon the workpiece, and bearing means along said second reach for providing lateral support to said carriers.

2. The combination set forth in claim 1 wherein said bearing means comprises a plurality of longitudinally extending surfaces.

3. The combination set forth in claim 2 including means for lubricating said surfaces.

* * * * *